Feb. 2, 1943.  A. WICKSTROM  2,309,721
FASTENER
Filed Nov. 12, 1941
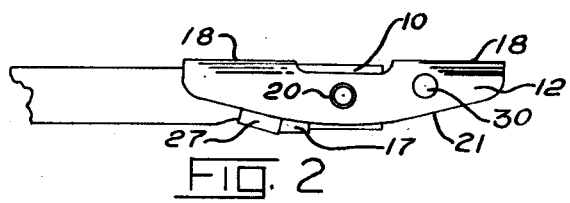
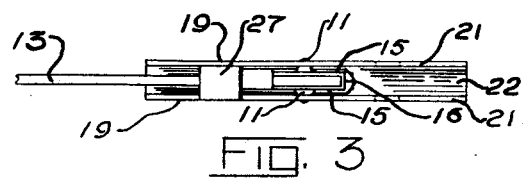
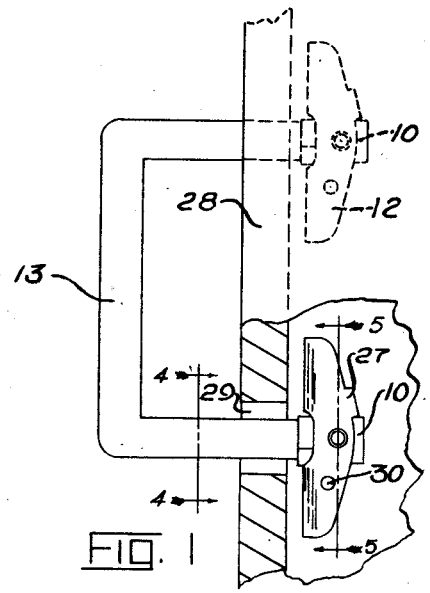
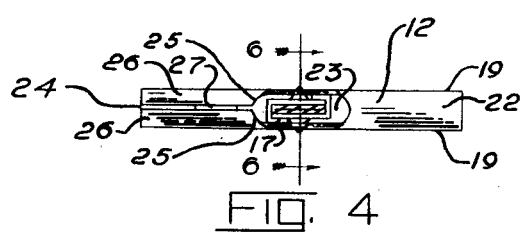
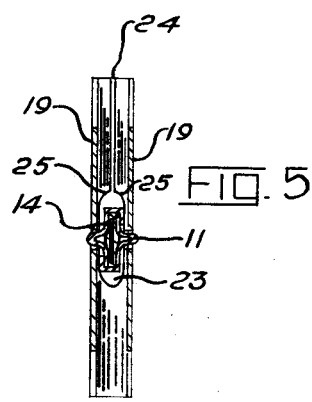
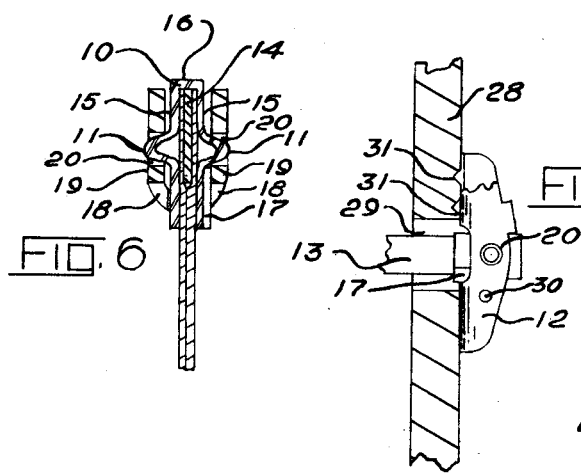
INVENTOR
ARVID WICKSTROM
BY
G. H. Braddock
ATTORNEY Patented Feb. 2, 1943

2,309,721

UNITED STATES PATENT OFFICE 2,309,721

FASTENER

Arvid Wickstrom, Minnneapolis, Minn.

Application November 12, 1941, Serial No. 418,765

14 Claims. (Cl. 2—271)

This invention has relation to a fastener useful for many purposes but more especially useful for employment to the purpose of attaching strap elements or loop elements to wearing apparel.

An object of the invention is to provide a fastener of simple, novel and improved construction.

A further object is to provide a fastener wherein will be incorporated improved features and characteristics of construction novel both as individual entities of the fastener and in combination with each other.

And a further object is to provide a fastener, especially useful to the purpose of attaching straps or loops to garments, as, for example, overcoats, of structure as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a side elevational view of a pair of duplicate fasteners, one disclosed in full lines and one disclosed in dotted lines, made according to the invention, as when applied to use to attach a loop to a garment of wearing apparel;

Fig. 2 is an enlarged side elevational view of either of the fasteners of Fig. 1 disclosing the parts of the fastener as when situated for assembly with a garment or article to which a strap or loop is to be attached;

Fig. 3 is a bottom edge view of the fastener as it would appear from the bottom of the sheet in Fig. 2;

Fig. 4 is a top edge view of the fastener with the parts positioned as in Fig. 1, disclosing a strap or loop retained by said fastener in transverse section taken on line 4—4 in said Fig. 1;

Fig. 5 is an enlarged longitudinal sectional view taken on line 5—5 in Fig. 1;

Fig. 6 is an enlarged transverse sectional view taken on line 6—6 in Fig. 4; and Fig. 7 is a side elevational view of a fastener of slightly modified construction including features and characteristics of the invention as when applied to use to attach a strap to a garment or other article.

Speaking generally, the fastener here presented consists of a gripping element 10 with oppositely disposed pintles 11 and an anchoring element 12 rotatably mounted upon the pintles 11.

More explicitly, the gripping element 10 is constituted as a single blank or strip of rigid material or metal bent upon itself in suitable and convenient fashion in tight grasping relation to an end portion of a strap or loop 13. As disclosed, the strap or loop 13 is tubular, or multiple-ply, and in order that the gripping element 10 can be tightly grasped upon said strap or loop, a filler element 14 is situated within the end portion of the strap or loop, between its plies, inside of said gripping element 10. Desirably parallel side walls 15, 15 of the gripping element 10, each integrally including one of the pintles 11, are provided by bending, at 16, a mid-portion of the blank or strip upon itself, and the pintles 11, 11 are constituted as upstruck portions of said side walls 15, 15. End walls of said gripping element are comprised as flange portions 17, 17 upon the side walls 15, 15. That is, a flange portion 17 upon a side edge of each side wall 15 is bent around the adjacent side edge of the opposite side wall 15 to provide each end wall of the gripping element 10. The flange portions 17, 17 are clamped down against the outer surfaces of the side walls 15, 15 in such manner as to cause the strap or loop 13 to be securely fastened within the gripping element 10, and the construction and arrangement are such that the extreme end portion of said strap or loop is adjacent to or contiguous with the bend 16 and that the major portion of the filler element 14 is situated at location between said flange portions 17, 17 and said bend 16. Stated differently, the portion of the strap or loop 13, with filler element 14, between the closed end, at the bend 16, and the flange portions 17, 17 of the gripping element 10 is thicker than the portion of said strap or loop which extends out of the open end, opposite the bend 16, of said gripping element, to the purpose that the strap or loop will be made securely rigid with the gripping element when the flange portions 17, 17 are clamped down against the outer surfaces of the side edge portions of the side walls 15, 15, as will be understood.

The anchoring element 12 also is constituted as a single blank or strip of metal or rigid material bent upon itself, at 18, 18, to provide spaced apart, desirably parallel side walls 19, 19 of said anchoring element each including a bearing opening 20 for one of the pintles 11. The bearing openings 20, 20 are disposed directly opposite each other, and as disclosed each bearing opening 20 is situated at the midlength of its corresponding side wall 19 in spaced relation to the bends 18, 18 and the free edge 21 of said corresponding side wall 19.

A connecting wall 22 of the anchoring element 12 between the side walls 19, 19 is constituted as material or metal of the blank or strip situated between the bends 18, 18. Said connecting wall 22 is generally curvilinear in direction transversely thereof. In longitudinal direction, the connecting wall 22 is straight as disclosed.

The pintles 11, 11 upon the side walls 15, 15 of the gripping element 10 are mounted in the bearing openings 20, 20 in the side walls 19, 19 of the anchoring element 12 in such manner that said gripping element can be rotated in said anchoring element with said side walls 15, 15 adjacent to and between the inner surfaces of said side walls 19, 19.

The connecting wall 22 of said anchoring element 12 is cut away at its mid-portion to provide a clearance opening 23 directly over or adjacent to the bearing openings 20, 20, and one end portion of said connecting wall is provided with a slit or slot 24 which extends longitudinally of the anchoring element, desirably at the mid-width of its connecting wall, from the clearance opening 23 to one end of said anchoring element. As shown, the end portion of the connecting wall 22 opposite the slit or slot 24 is continuous. Said slit or slot 24 provides, together with the clearance opening 23, locking shoulders 25, 25 at the location of merging of the slit or slot and said clearance opening. While the material or metal of the anchoring element is rigid, it is slightly flexible so that the portions of the material or metal at the opposite sides of the slit or slot 24 constitute flexible arms 26, 26 of said anchoring element which in fact provide said locking shoulders 25, 25. The free edge 21 of one of the side walls 19 integrally supports a limit piece 27 which extends transversely of the anchoring element to the free edge 21 of the opposite side wall 19 and is situated upon said anchoring element at the same side of the clearance opening 23 as is the slit or slot 24. The anchoring element 12 is open at the location of the free edges 21, 21 of the side walls 19, 19 save for the limit piece 27.

The overall width of the gripping element 10 is such as to permit positioning of the parts of the fastener as in Figs. 2 and 3. As there shown, the strap or loop 13 and said gripping element are longitudinally alined with the anchoring element 12 and the gripping element is disposed between the side walls 19, 19 of said anchoring element in such manner that the width of said gripping element is confined at one side thereof by the inner surfaces of the flexible arms 26, 26 at and adjacent to the slit or slot 24. When the parts of the fastener are situated as in said Figs. 2 and 3, said fastener is ready for assembly with a garment or article to which the strap or loop 13 is to be attached. Such a garment or article is denoted at 28 and includes an opening 29 of dimension for free passage of the fastener with its parts positioned as in Figs. 2 and 3.

After the fastener is inserted, the gripping element 10 and the anchoring element 12 are swung with respect to each other until relatively situated as in Figs. 1, 4 and 7. That is to say, the strap or loop 13 and said gripping element 10 are swung upwardly, about the bearings provided by the pintles 11 and the openings 20, 20, from position as in Fig. 2 to position as in Fig. 4.

The gripping element 10 has thickness slightly greater than the width of the slit or slot 24, and during swinging movement of said gripping element from position as in said Fig. 2 toward position as in said Fig. 4 the flexible arms 26, 26 are forcibly spread apart by the gripping element to allow passage of said gripping element through and along the slit or slot 24. Immediately upon movement of said gripping element clear of the inner end of the slit or slot, to position where the whole of the width of the gripping element is within the clearance opening 23, as in Figs. 1, 4 and 7, the flexible arms 26, 26 move toward each other, by reason of their natural resilience, to cause the locking shoulders 25, 25 to lie back of said gripping element and thus preclude the possibility of substantial movement of the gripping element and the anchoring element relatively to each other away from the position in which disclosed in said Figs. 1, 4 and 7. Stated otherwise, when the parts of the fastener are relatively situated as in Figs. 1, 4 and 7, the gripping element and the anchoring element are retained substantially at right angular relation to each other against the possibility that the parts of the fastener can accidentally be moved back to longitudinally alined relation as in Figs. 2 and 3.

While the opening 29 is of sufficient size or cross-sectional area to permit passage of the fastener, into the garment or article, with its parts relatively positioned as in Figs. 2 and 3, said opening 29 is of insufficient size or cross-sectional area to permit passage of the fastener, out of the garment or article, when its parts are relatively positioned as in Figs. 1, 4 and 7. Of course, the opening 29 can be closed after the fastener is inserted and anchored in the garment or article, but the construction and arrangement make such closing unnecessary.

Numeral 30 denotes thread receiving holes in the side walls 19, 19 of the anchoring element 12 by employment of which the fastener, after inserted, can be stitched to a garment.

The fastener of Fig. 7 is in all respects like the fastener of Figs. 1 to 6, but additionally includes prongs or protuberances 31, 31 adapted to imbed themselves in the material of a garment or article upon which the fastener is anchored. As disclosed, the prongs or protuberances 31, 31 are situated upon the outer surfaces of the free edge portions of the flexible arms 26, 26, adjacent the slit or slot 24.

What is claimed is:

1. In combination, a gripping element, a strap secured thereto, spaced apart bearing entities upon said gripping element, an anchoring element, and spaced apart bearing entities upon said anchoring element complemental to and interengaged with the bearing entities upon said gripping element.

2. In combination, a gripping element, a strap secured thereto, spaced apart pintles upon said gripping element, an anchoring element, and spaced apart bearings upon said anchoring element rotatably supporting said pintles.

3. In combination, a gripping element, a strap secured thereto, spaced apart, oppositely disposed pintles upon and integral with said gripping element, and an anchoring element including spaced apart side walls having bearing openings in which said pintles are rotatably mounted.

4. In combination, a gripping element, a strap secured thereto, spaced apart, oppositely disposed bearing entities upon said gripping element, an anchoring element including spaced apart side walls, and spaced apart, oppositely disposed bearings entities upon said side walls complemental to and interengaged with the bearing entities upon said gripping element.

5. In combination, a gripping element, a strap secured thereto, an anchoring element constituted as spaced apart side walls and a connecting wall between said spaced apart side walls, spaced apart, oppositely disposed bearing entities upon said gripping element, and spaced apart, oppositely disposed bearing entities upon the side walls of said anchoring element complemental to and interengaged with the bearing entities upon said gripping element.

6. In combination, a gripping element, a strap secured thereto, spaced apart bearing entities upon said gripping element, an anchoring element constituted as speced apart side walls and a connecting wall between said spaced apart side walls, and spaced apart bearing entities upon said side walls complemental to and interengaged with the bearing entities upon said gripping element, there being a clearance opening in said connecting wall and a slot in an end portion of the connecting wall communicating with said clearance opening.

7. In combination, a gripping element, a strap secured thereto, spaced apart bearing entities upon said gripping element, an anchoring element constituted as spaced apart side walls and a connecting wall between said spaced apart side walls, and spaced apart bearing entities upon said side walls complemental to and interengaged with the bearing entities upon said gripping element, there being a clearance opening in said connection wall at location adjacent said bearing entities and a slot having width less than the thickness of said gripping element in an end portion of the connecting wall and communicating with said clearance opening.

8. In combination, a gripping element, a strap secured thereto, spaced apart bearing entities upon said gripping element, an anchoring element constituted as spaced apart side walls and a connecting wall between said spaced apart side walls, and spaced apart bearing entities upon said side walls complemental to and in interengaged with the bearing entities upon said gripping element, there being a clearance opening in said connecting wall and a slot having width less than the thickness of said gripping element extending longitudinally in an end portion of the connecting wall and communicating with said clearance opening, said longitudinal slot defining flexible arms of the anchoring element providing locking shoulders at the location of merging of the clearance opening and the slot.

9. In combination, a gripping element, a strap secured thereto, spaced apart bearing entities upon said gripping element, an anchoring element including spaced apart side walls and a connecting wall between said spaced apart side walls, spaced apart bearing entities upon said spaced apart side walls complemental to and interengaged with the bearing entities upon said gripping element, and flexible arms constituted as parts of said anchoring element disposed between said side walls to provide a clearance opening between the flexible arms and said connecting wall and a slot between the flexible arms having width less than the thickness of said gripping element.

10. In combination, a gripping element, a strap secured thereto, spaced apart bearing entities upon said gripping element, an anchoring element including spaced apart side walls and a connecting wall between said spaced apart side walls, spaced apart bearing entities upon said spaced apart side walls complemental to and interengaged with the bearing entities upon said gripping element, flexible arms constituted as parts of said anchoring element disposed between said side walls substantially at the elevation of said connecting wall to provide a clearance opening between the flexible arms and the connecting wall and a slot between said flexible arms disposed longitudinally of said anchoring element and extending from an end thereof to the location of said clearance opening, and locking shoulders provided by said flexible arms at the location of merging of said slot with portions of the anchoring element providing the clearance opening.

11. The combination as specified in claim 10, and a limit piece upon one of said side walls in spaced relation to said flexible arms and at the side of said clearance opening adjacent the flexible arms.

12. The combination as specified in claim 10, and there being a thread receiving hole through a portion of said anchoring element.

13. The combination as specified in claim 10, and an article engaging protuberance upon said anchoring element.

14. In combination, a gripping element, a strap secured thereto, spaced apart pintles upon said gripping element, an anchoring element including spaced apart side walls having bearing openings receiving said pintles and a connecting wall between said spaced apart side walls, flexible arms constituted as parts of said anchoring element disposed between said side walls substantially at the elevation of said connecting wall to provide a clearance opening between the flexible arms and the connecting wall, as well as between said side walls, and a slot between said flexible arms disposed longitudinally of said anchoring element and extending from an end thereof to the location of said clearance opening, and locking shoulders provided by said flexible arms at the location of merging of said slot with portions of the anchoring element providing the clearance opening, said locking shoulders being spaced apart a distance less than that representing the thickness of said gripping element.

ARVID WICKSTROM.